United States Patent
Roepke et al.

(10) Patent No.: US 11,100,626 B2
(45) Date of Patent: Aug. 24, 2021

(54) SYSTEMS AND METHODS FOR MONITORING MANUFACTURING PROCESSES

(71) Applicant: Hutchinson Technology Incorporated, Hutchinson, MN (US)

(72) Inventors: Jeffrey L. Roepke, Glencoe, MN (US); John M. Kaiser, Dassel, MN (US); Joel D. Millett, Horseheads, NY (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 292 days.

(21) Appl. No.: 16/406,580

(22) Filed: May 8, 2019

(65) Prior Publication Data
US 2019/0347782 A1    Nov. 14, 2019

Related U.S. Application Data

(60) Provisional application No. 62/669,266, filed on May 9, 2018.

(51) Int. Cl.
*G06T 7/00* (2017.01)
*H04N 5/247* (2006.01)
(Continued)

(52) U.S. Cl.
CPC ....... *G06T 7/0004* (2013.01); *G01N 21/8901* (2013.01); *G05B 19/41805* (2013.01);
(Continued)

(58) Field of Classification Search
CPC .............. G06T 7/0004; G06T 7/73; G06T 2207/10152; G06T 2207/30204;
(Continued)

(56) References Cited

U.S. PATENT DOCUMENTS

| 7,353,954 | B1 * | 4/2008 | Malek | B07C 5/3404 |
| | | | | 198/400 |
| 2004/0030514 | A1 * | 2/2004 | Popp | B65H 39/14 |
| | | | | 702/81 |
| 2012/0308754 | A1 * | 12/2012 | Dehlinger | C09J 7/22 |
| | | | | 428/41.8 |
| 2013/0184839 | A1 * | 7/2013 | Bauer | G05B 15/02 |
| | | | | 700/83 |

(Continued)

OTHER PUBLICATIONS

J. Molleda, R. Usamentiaga, D. F. Garcia, F. G. Bulnes and L. Ema, "Shape Measurement of Steel Strips Using a Laser-Based Three-Dimensional Reconstruction Technique," in IEEE Transactions on Industry Applications, vol. 47, No. 4, pp. 1536-1544, July-Aug. 2011, doi: 10.1109/TIA.2011.2155019. (Year: 2011).*

(Continued)

*Primary Examiner* — Marnie A Matt
(74) *Attorney, Agent, or Firm* — DLA Piper LLP (US)

(57) ABSTRACT

A system for monitoring a process step during manufacturing of an assembly sheet includes a detection camera configured to capture a first image of the assembly sheet, the first image including a locating feature of the assembly sheet, a vacuum hold-down device for selectively inhibiting advancement of the assembly sheet along a process step line for a predetermined measurement time, and a measurement camera configured to capture a second image of the assembly sheet responsive to the vacuum hold-down device inhibiting advancement of the assembly sheet, the second image including one or more features of a coupon of the assembly sheet.

46 Claims, 6 Drawing Sheets

(51) Int. Cl.
*G06T 7/73* (2017.01)
*G05B 19/418* (2006.01)
*G01N 21/89* (2006.01)

(52) U.S. Cl.
CPC ............... *G06T 7/73* (2017.01); *H04N 5/247* (2013.01); *G05B 2219/31323* (2013.01); *G05B 2219/40111* (2013.01); *G05B 2219/49136* (2013.01); *G06T 2207/10152* (2013.01); *G06T 2207/30204* (2013.01)

(58) Field of Classification Search
CPC ............. H04N 5/247; G05B 19/41805; G05B 2219/40111; G05B 2219/49136; G05B 2219/31323; G05B 2219/45028; G05B 2219/37555; G01N 21/8901; G01N 2021/8416; Y02P 90/02
USPC .......................................................... 704/84
See application file for complete search history.

(56) References Cited

U.S. PATENT DOCUMENTS

| | | | |
|---|---|---|---|
| 2015/0053349 A1* | 2/2015 | Mori | B31F 1/2836 156/355 |
| 2016/0046033 A1* | 2/2016 | Zuech | B26D 5/34 700/127 |
| 2017/0339335 A1* | 11/2017 | Kuokkanen | G05B 15/02 700/83 |

OTHER PUBLICATIONS

X. Xiong, Y. Hu and S. Cheng, "Research on Real-Time Multi-object Detections Based on Template Matching," 2020 3rd International Conference on Advanced Electronic Materials, Computers and Software Engineering (AEMCSE), Shenzhen, China, 2020, pp. 320-324, doi: 10.1109/AEMCSE50948.2020.00075. (Year: 2020).*

* cited by examiner

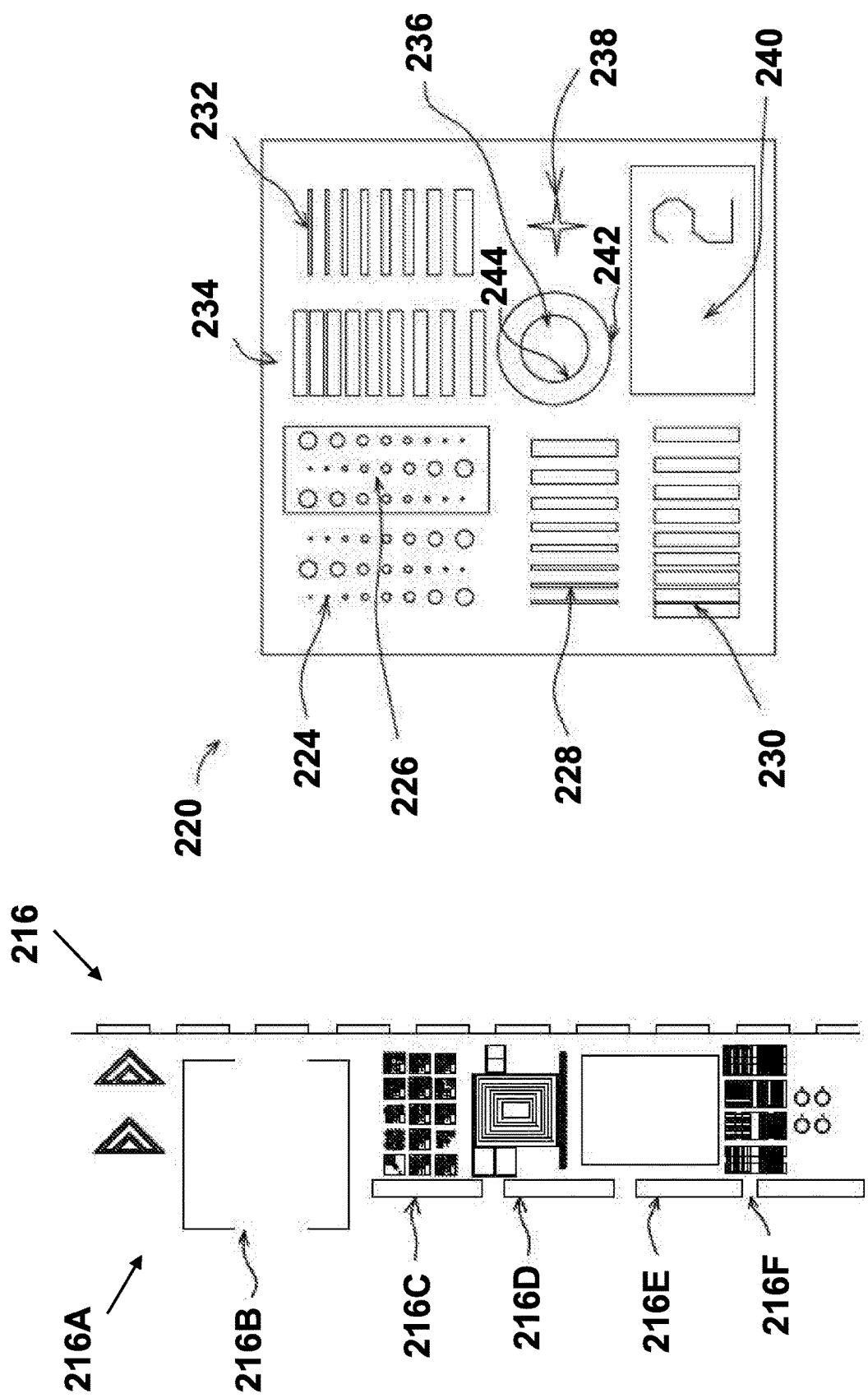

SYSTEMS AND METHODS FOR MONITORING MANUFACTURING PROCESSES

CROSS-REFERENCE TO RELATED APPLICATIONS

This application claims priority from U.S. Provisional Patent Application No. 62/669,266, filed on May 9, 2018, which is hereby incorporated by reference in its entirety.

TECHNICAL FIELD

The present disclosure relates generally to manufacturing systems and methods, more specifically, the present disclosure relates to systems and methods for monitoring manufacturing process steps.

BACKGROUND

Often, components requiring a plurality of process steps to manufacture are manufactured in an assembly sheet, which contains a plurality of components (e.g., 10 components, 50 components, 150 components, etc.) The assembly sheet is one of a plurality of assembly sheets defining a web that advances through a roll-to-roll manufacturing system. For example, a first process step may be performed on or to the web and its assembly sheets using a first roll-to-roll manufacturing system, then the web is transferred to a second roll-to-roll manufacturing system, which performs a second process step. As each manufacturing process step is repeated many times to form components, variations can occur in the process step which make the components unable to function as required (e.g., the components may be defective). In some cases, these variations can cause an entire assembly sheet or an entire web to be defective (e.g., thousands of components are defective).

SUMMARY

According to some implementations of the present disclosure, a method for monitoring a process step during manufacturing of a plurality of assembly sheets, the method comprises, with the plurality of assembly sheets advancing between a first roll and a second roll, receiving, from a first camera, a first set of image data reproducible as a first image of a first portion of a first assembly sheet of the plurality of assembly sheets, analyzing, using one or more processors, the first set of image data to identify a locating feature of the first assembly sheet, determining, using at least one of the one or more processors and the first set of image data, a position of the locating feature relative to the first camera, based on the determined position of the locating feature and a predefined distance between the first camera and the second camera, determining a first assembly sheet stop time, inhibiting further advancement of the first assembly sheet, receiving, from the second camera, a second set of image data reproducible as a second image of a second portion of the first assembly sheet, analyzing, using at least one of the one or more processors, the second set of image data to identify a coupon of the first assembly sheet, detecting, using at least one of the one or more processors, one or more features of the identified coupon, measuring, using at least one of the one or more processors, one or more dimensions of the one or more detected features of the identified coupon, and permitting advancement of the first assembly sheet.

According to some implementations of the present disclosure, a system for monitoring a process step during manufacturing of an assembly sheet includes a detection camera configured to capture a first image of the assembly sheet, the first image including a locating feature of the assembly sheet, a vacuum hold-down device for selectively inhibiting advancement of the assembly sheet along a process step line, and a measurement camera configured to capture a second image of the assembly sheet responsive to the vacuum hold-down device inhibiting advancement of the assembly sheet, the second image including one or more features of a coupon of the assembly sheet.

According to some implementations of the present disclosure, a system for monitoring a process step during manufacturing of a plurality of assembly sheets includes at least one detection camera, at least one measurement camera positioned downstream relative to the detection camera in the process line, a vacuum hold-down device, one or more processors, and a memory device storing instructions that, when executed by at least one of the one or more processors cause the system to, receive, from the at least one detection camera, a first set of image data reproducible as a first image of a first portion of a first assembly sheet of the plurality of assembly sheets, analyze, the first set of image data to identify a locating feature of the first assembly sheet, determine, a position of the locating feature relative to the at least one detection camera, based on the determined position of the locating feature and a predetermined distance between the locating feature and a coupon of the first assembly sheet, determine a first assembly sheet stop time, activate the vacuum hold-down device to inhibit further advancement of the first assembly sheet at the first for a predetermined measurement period, receive, from the measurement camera, a second set of image data reproducible as a second image of a second portion of the first assembly sheet, analyze the second set of image data to identify one or more features of the coupon of the first assembly sheet, measure one or more dimensions of the one or more identified features of the coupon, and deactivate the vacuum hold-down device to release the first assembly sheet and permit advancement of the first assembly sheet.

According to some implementations of the present disclosure, a method for monitoring a process step during manufacturing of a plurality of assembly sheets includes receiving, from a first camera, a first set of image data reproducible as a first image of a first portion of a first assembly sheet of the plurality of assembly sheets, determining, using the first set of image data, a position of a locating feature of the first assembly relative to the first camera, inhibiting further advancement of the first assembly sheet such that one or more coupon features of the first assembly sheet are positioned with a field of view of a second camera for a predetermined measurement period, receiving, from the second camera, a second set of image data reproducible as a second image of a second portion of the first assembly sheet, analyzing the second set of image data to identify the one or more coupon features of the first assembly sheet, measuring one or more dimensions of the one or more coupon features of the first assembly sheet, and responsive to determining that the predetermined measurement period has elapsed, permitting advancement of the first assembly sheet.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 2B illustrates a plan view of a plurality of coupon features and a locating feature of the assembly sheet of FIG. 2A for use with a process step monitoring system according to some implementations of the present disclosure;

FIG. 2C illustrates a plan view of an exemplary process coupon of the plurality of coupon features of FIG. 2B for use with a process step monitoring system according to some implementations of the present disclosure;

Figure 1:
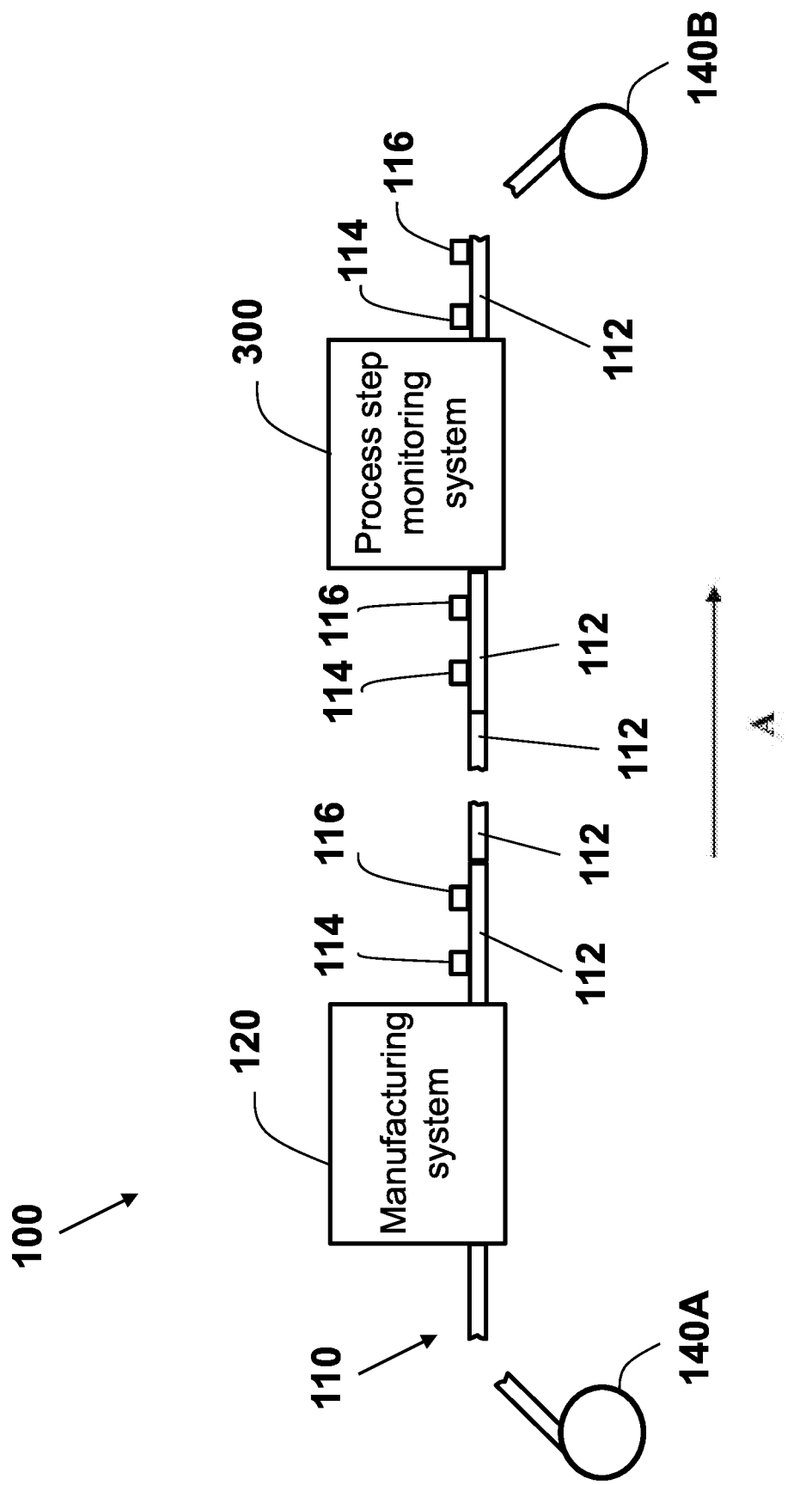
FIG. 1 illustrates a schematic of a roll-to-roll manufacturing system including a process step monitoring system according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Referring to FIG. 1, a roll-to-roll manufacturing system 100 includes a web 110, a manufacturing system 120, and a process step monitoring system 300. The roll-to-roll manufacturing system 100 can also include a first roll 140A and a second roll 140B. Generally, the web 110 travels in the direction of arrow A starting at the first roll 140A, through the manufacturing system 120 and the process step monitoring system 300, and ends at the second roll 140B. As described in further detail below, the roll-to-roll manufacturing system 100 can generally be part of a larger overall assembly line that includes a variety of different equipment for performing different tasks on/with the web 110.

The web 110 is a base layer (e.g., stainless steel) upon which other material layers and/or features are formed as the web 110 travels in the direction of arrow A through the manufacturing system 120. In some implementations, the web 110 is initially provided on the first roll 140A and is unwound or unrolled by an unwinding machine (not shown). The web 110 is then wound back into the second roll 140B by a winding machine (not shown). Transport mechanisms (e.g., rollers, pairs of rollers, active/motorized rollers, guide rollers, etc.) cause the web 110 to move generally horizontally through the manufacturing system 120 and the process step monitoring system 300. In other implementations, the web 110 is first provided on the first roll 140A and is advanced through the manufacturing system 120 and wound back into a roll by a winding machine (not shown). The web 110 can be advanced between the first roll 140A and the second roll 140B at a rate, such as, for example, between about 0.1 meters per minute and about 10 meters per minute, between about 1 meter per minute and about 8 meters per minute, between about 1 meter per minute and about 4 meters per minute, etc. The web 110 can be transported between different equipment/systems as a roll.

As shown in FIG. 1, the web 110 is partitioned into a plurality of assembly sheets 112. Each of the plurality of assembly sheets 112 includes a plurality of components 114 and one or more coupon features 116. The plurality of components 114 can be a variety of different components, such as, for example, components for disk drive head suspensions (e.g., flexures), shape memory alloy actuators for autofocus and optical image stabilization assemblies, etc. The plurality of components 114 and the one or more coupon features 116 are formed on the web 110 using a plurality of process steps. More specifically, each of the plurality of components 114 on each assembly sheet 112 includes a plurality of layers, such as, for example, a base substrate (e.g., stainless steel), a first insulating layer (e.g., a dielectric material, a polyimide material, etc.), a conductive layer (e.g., copper, nickel, gold, or any combination thereof), a second insulating layer (e.g., a dielectric material, a polyimide material, etc.), a plating layer (e.g., chrome, nickel, gold, or any combination thereof), or any combination thereof. Further, each of the plurality of layers of the plurality of components 114 includes one or more features (e.g., the conductive layer includes a wiring (trace) pattern and/or terminals).

The manufacturing device 120 performs one or more of the plurality of process steps required to manufacture the plurality of components 114 and the one or more coupon features 116. The manufacturing device 120 can form the plurality of components 114 and coupon features 116 on each of the plurality of assembly sheets 112 using, for example, additive deposition and/or subtractive deposition and/or subtractive processes such as wet (e.g., chemical) and dry (e.g., plasma) etching, electro-plating and electro-less plating and sputtering processes in connection with photolithography. The manufacturing device 120 can deposit, etch, expose, and/or develop one or more layers of material. For example, the manufacturing device 120 can deposit one or more dielectric layers (e.g., polyimide) and/or one or more conductive layers (e.g., copper, chrome, nickel, gold, or the like, or any combination thereof) each of these layers can be subjected to one or more processes that include, for example, exposure to a light (e.g., during a photolithography process to harden a portion of the material) and/or exposure to one or more chemicals (e.g., to develop the unexposed portions of the material and/or deposit a layer of material on the substrate and/or other process techniques).

The manufacturing device 120 of the roll-to-roll manufacturing system 100 shown in FIG. 1 performs one or more process steps on the assembly sheets 112 of the web 110, thereby forming at least a part of the plurality of components 114 and/or the one or more coupon features 116. After the web 110 passes through the manufacturing device 120 and the process step monitoring system 300, the web 110 is wound back into a roll (e.g., the second roll 140B) and transferred to a second roll-to-roll manufacturing system that is the same as, or similar to, the roll-to-roll manufacturing system 100, except that the manufacturing system of the second roll-to-roll manufacturing system performs a process step that is separate and distinct from the process step performed by the manufacturing device 120. In this manner, the roll-to-roll manufacturing system 100 can be used as part of a larger assembly line to produce completed components 114 in each of the plurality of assembly sheets 112.

During manufacture of the plurality of components 114 using one or more process steps, each process step may drift over time due to one or more factors (e.g., chemical control, temperature, process flow rate, expose energies and/or the like). The one or more coupon features 116 are generally used to indicate whether a portion of the plurality of components 114 were manufactured correctly, whether a portion of the plurality of components 114 includes an abnormality (e.g., defect), and/or whether parameters, characteristics and/or other aspects of the manufacturing process need to be altered before abnormal (e.g., defective) components 114 are produced. In some implementations, the one or more coupon features 116 may include a plurality of features that are created during the process steps used to manufacture the plurality of components 114 of each assembly sheet 112. In other implementations, the one or more coupon features 116 are configured to be more sensitive to process step variations than the plurality of components 114 being manufactured using the process step. Thus, if a measurement or test of the one or more coupon features 116 reveals abnormalities (e.g., defects), it is likely that the corresponding feature of the plurality of components 114 also includes abnormalities or that the process step has deviated from its operating tolerances.

In some implementations, the plurality of coupon features 116 can include a barcode. Each barcode corresponds to an associated one of the plurality of assembly sheets 112. Thus, scanning the barcode (e.g., using the process step monitoring system 300) permits each individual assembly sheet to be associated with a unique identifier. For example, if (as described in further detail below) the process step monitoring system 300 identifies abnormal (e.g., defective) components on one of the plurality of assembly sheets 112, the system 300 can associated that data with the individual assembly sheet using the barcode (e.g., so that the assembly sheet can be removed from the web 110).

Figure 2A:
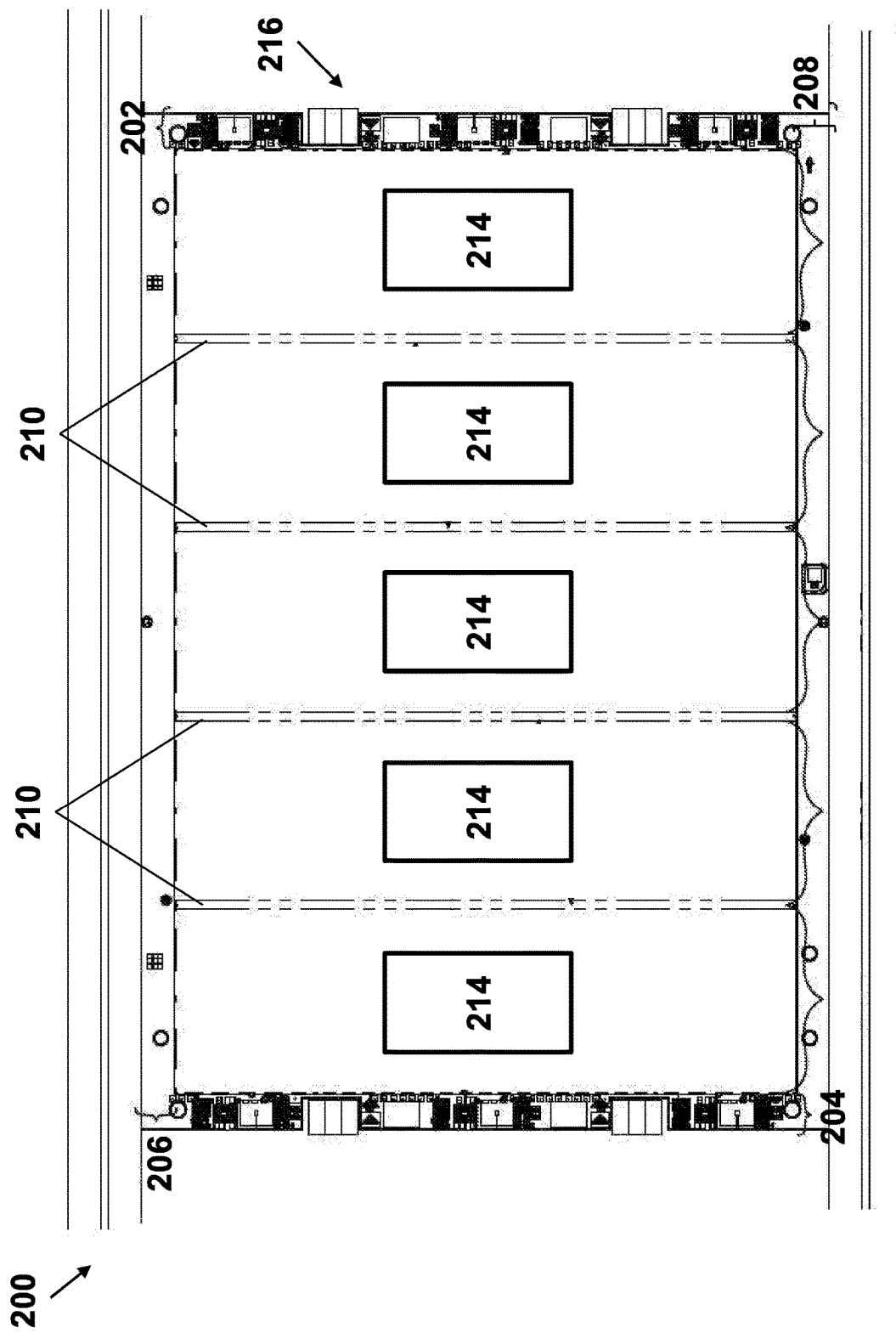
FIG. 2A illustrates a plan view of an exemplary assembly sheet of a web of the roll-to-roll manufacturing system of FIG. 1 including a process step monitoring system according to some implementations of the present disclosure.

Referring to FIG. 2A, an exemplary assembly sheet 200 that is the same as, or similar to, each of the plurality of assembly sheets 112 described above is shown. The assembly sheet 200 includes a leading edge 202, a trailing edge 204, an upper edge 206, a lower edge 208, a plurality of carrier strips 210, a plurality of components 214, and a plurality of coupon features 216. The plurality of components 214 are the same as, or similar to, the plurality of components 114 (FIG. 1), and are formed in columns and are supported by the plurality of carrier strips 210. The leading edge 202, the rear edge 204, the upper edge 206, and the lower edge 208 are used in the manufacturing process to aid in moving the assembly sheet 200 through the process (e.g., through the manufacturing system 120) and to protect the plurality of components 214 by adding a stiffening structure and limiting excessive bending or movement, therefore minimizing damage to the plurality of components 214.

As shown, the plurality of coupon features 216 are formed on the leading edge 202 and the rear edge 204 of the assembly sheet 200. Additionally, or alternatively, the plurality of coupon features 216 can also be formed at other locations on the assembly sheet 200. For example, the plurality of coupon features 216 can be formed on the upper edge 206, the lower edge 208, the plurality of carrier strips 210, or any combination thereof. As another example, the plurality of coupon features 216 can also be formed between rows of the plurality of components 214 (e.g., between an opposing pair of the plurality of carrier strips 210).

Referring to FIG. 2B, the plurality of coupon features 216 includes a locating feature 216A and a plurality of different types of process coupons 216B-216F. As shown, the locating feature 216A has a generally v-shape or "chevron" shape. Generally, the locating feature 216A is larger than the individual features of the process coupons 216B-216F (e.g., twice as large, five times as large, ten times as large, etc.) And as described in further detail below, a detection camera of the process step monitoring system 300 identifies the locating feature 216A in order to position the different types of process coupons 216B-216F within the field of view of a measurement camera.

Referring to FIG. 2C, an exemplary process coupon 220 includes a plurality of features 224-244. Feature 224 includes a series of holes with a range of different diameters that may be formed in, for example, polyimide, a photoresist layer, Cu, SST layer, Ni, Au and/or the like by the additive and/or subtractive processes used in producing the plurality of components 214. According to some implementations, feature 224 is configured to indicate a minimum adhesion cleared hole for a process step. As described in further detail below, the process step monitoring system 300 may determine the smallest hole that is being cleared out consistently, which provides an indication at how well the manufacturing process used to produce the plurality of components 214 is working. For example, if the plurality of components 214 includes holes that are 10 microns, the holes of the features 224 may be smaller than 10 microns to determine whether the manufacturing process step is drifting before faulty or defective components are produced.

Feature 226 includes a series of dots that are formed of, for example, polyimide, Cu, Ni, Au and/or the like by the additive and/or subtractive processes used in producing the plurality of components 214 on each assembly sheet 200. According to some implementations, feature 226 is configured to indicate a minimum adhered dot for a process. The process step monitoring system 300 may sense what the smallest dots that are being adhered to the surface of the coupon 220 using techniques including those described herein, as determined by the presence of the smallest dot on the surface of the coupon 220.

Features 228, 232 include vertical and horizontal troughs, respectively, having a range of different widths and spacing's that are formed in, for example, polyimide, a photoresist layer, copper (Cu), stainless steel (SST) layer, nickel (Ni), gold (Au) and/or the like by the additive and/or subtractive processes used in producing the plurality of components 214 of the assembly sheet 200. According to some implementations, features 228, 232 are configured to indicate a minimum cleared vertical or horizontal trough for a process. The process step monitoring system 300 may sense the smallest trough 228, 232 that is being cleared out consistently using techniques including those described herein, which provides an indication at how well the manufacturing process used to produce the plurality of components 214 is working.

Features 230, 234 include vertical and horizontal lines, respectively, having a range of different widths and spacings that are formed of, for example, polyimide, Cu, Ni, Au and/or the like by the additive and/or subtractive processes used in producing the plurality of components 114. According to various implementations, features 220, 234 are configured to indicate a minimum line adhered for a process. The process step monitoring system 300 may sense the smallest line that is being applied consistently to the coupon 220 using techniques including those described herein, which provides an indication at how well the manufacturing process used to produce the plurality of components 214 is working. According to various implementations, for example, the range of widths of the features 224-238 may be between about 5 microns and about 80 microns.

Since the web containing the assembly sheet 200, such as the web 110 shown in FIG. 1, is being translated through the manufacturing, such as the manufacturing system 120 shown in FIG. 1, in one direction (e.g., the direction of arrow A), chemicals may be applied to the web 110 either in the same direction or perpendicular to the direction that the web 110 is being translated. As such, variances between the vertical 228, 230 and horizontal features 232, 234 that are being cleared and/or applied may be different, which is why both vertical 228, 230 and horizontal 232, 234 troughs and lines are tested, according to some implementations. Similar to the features 224, if the plurality of components 214 includes troughs or holes that are 10 microns wide, the troughs or holes of the features 228-234 may be smaller than 10 microns to determine whether the manufacturing process is drifting before faulty or defective components 214 are produced.

Feature 236 is a registration feature to a previous layer. The feature 236 includes an outside rim 242, which is from one layer, and an inner circle 244, which is from a different layer. The feature 236 will be measured using the process step monitoring system 300 described herein to determine how well the two layers are registered to each other. How well one layer is registered to another layer is the degree to which the inner circle 244 of the feature 236 is offset from a desired central location in the outside rim 242 of the registration feature.

Feature 238 is a star shaped pattern which exaggerates the side slope of features of the plurality of components 214. The side slope of a feature is the angle of a side of the feature. That is, a feature (e.g., a polyimide layer) of the plurality of components 214 that is etched by the additive and/or subtractive processes used to produce the completed components may not have a side that is perpendicular to a surface of the substrate. The angle relative to a perpendicular of a feature is referred to as the side slope. As such, by testing the side slope of a feature 238 that exaggerates the side slope of the components 214, it can be determined that the side slope of the features of the components 214 are consistent.

Feature 240 is a calibration pad which can be used to calibrate the process step monitoring system 300. The feature 240 (i.e., the calibration pad) can be used to determine the focal height and light intensity of the process step monitoring system 300 based on the reflectivity of the calibration pad. The feature 240 can be made of the same material as the layer that is being formed on the substrate, such as the web 110 illustrated in FIG. 1. For example, the feature 240 may be made of a dielectric, conductive layer, or other material known in the art including those described herein. This will increase the likelihood that the feature 240 has the same reflectivity calibration (which may change due to topographic changes, surface oxide conditions, etc.) as the layer that is being formed on the web 110.

Figure 3A:
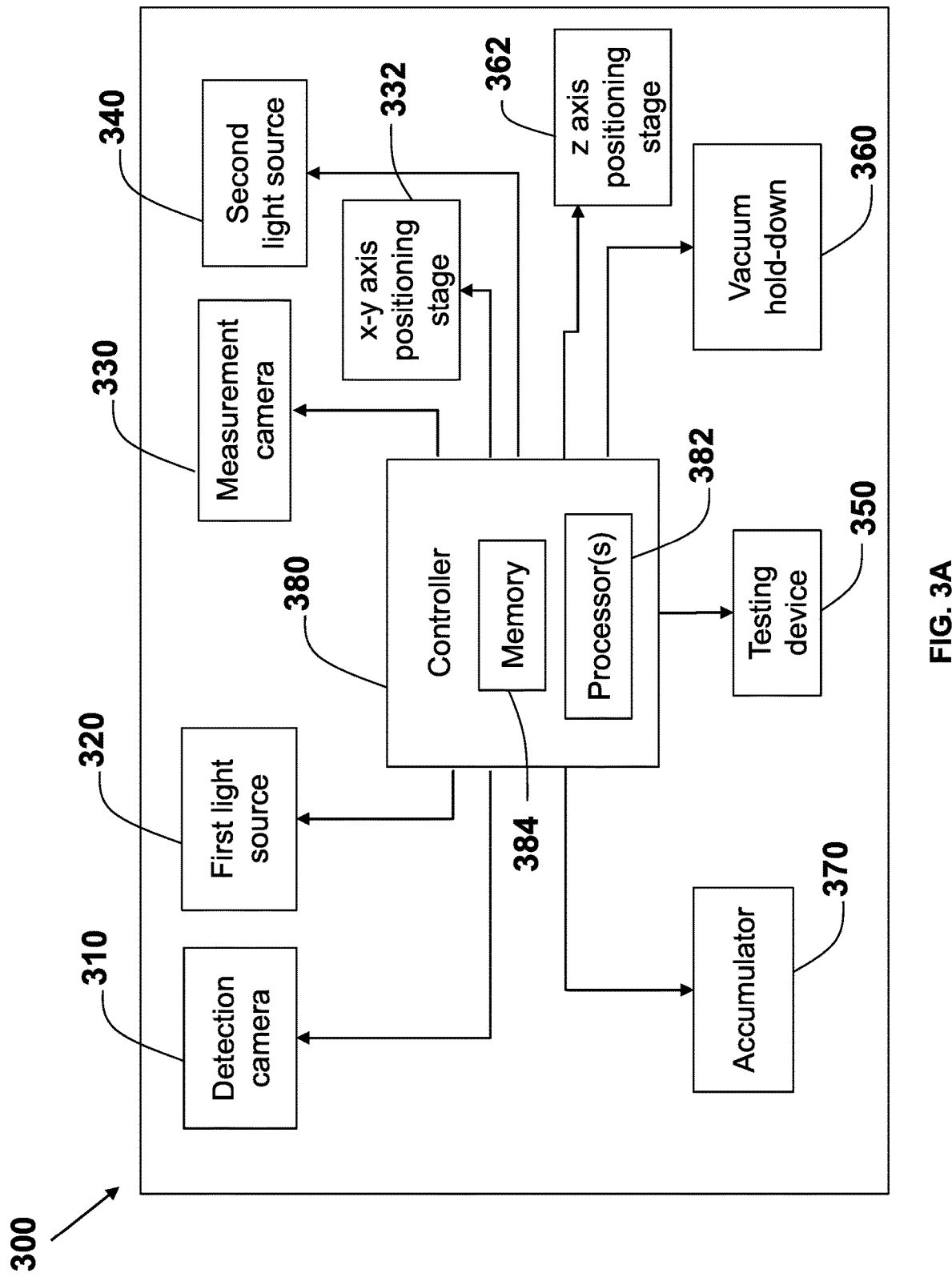
FIG. 3A illustrates a schematic block diagram of a process step monitoring system according to some implementations of the present disclosure.
Figure 3B:
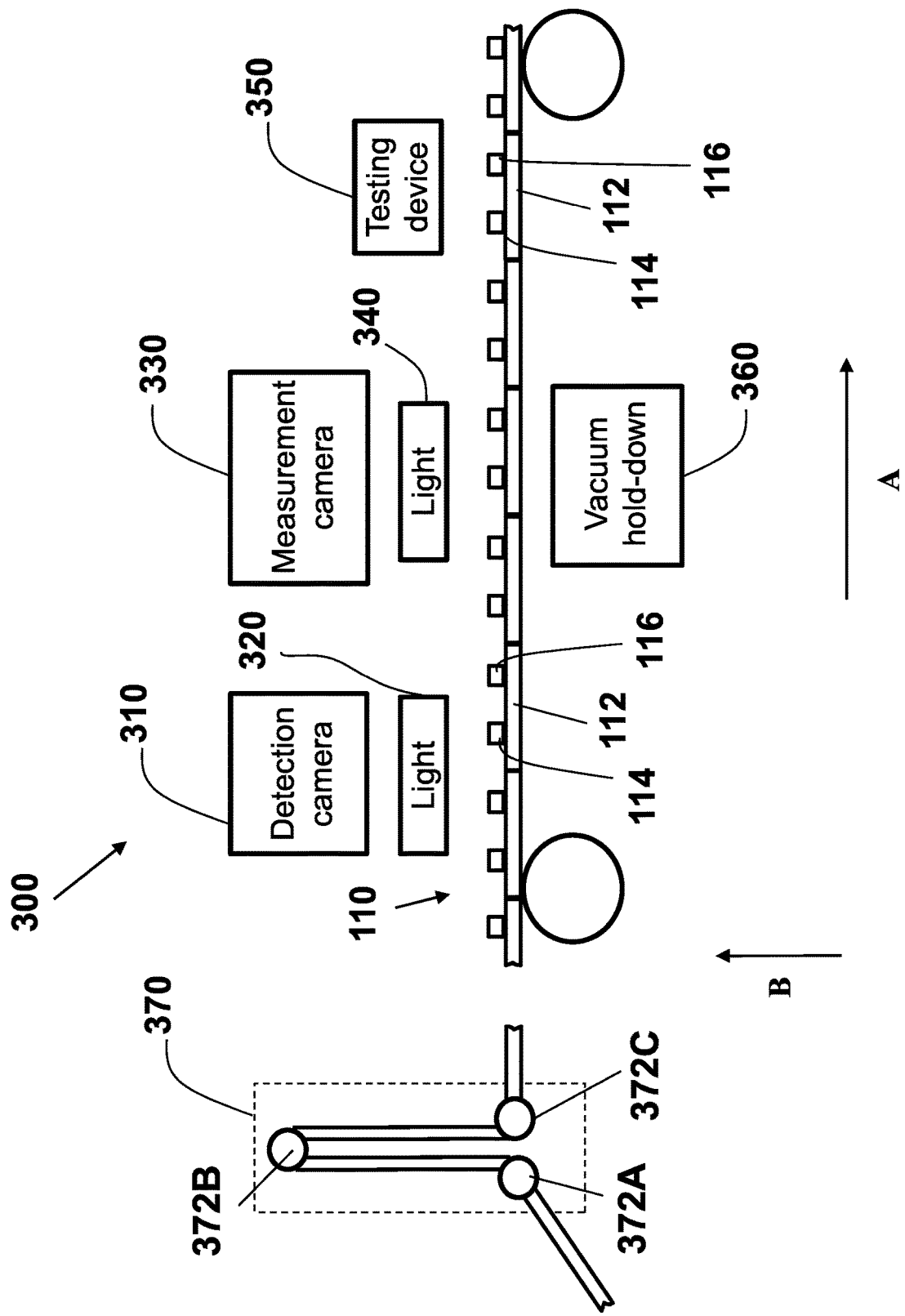
FIG. 3B illustrates a schematic illustration of the process step monitoring system of FIG. 3A according to some implementations of the present disclosure.

Referring generally to FIGS. 3A and 3B, the process step monitoring system 300 includes a detection camera 310, a first light source 320, a measurement camera 330, a second light source 340, an optional testing device 350, a vacuum hold-down device 360, an accumulator 370, and a controller 380 (FIG. 3A). Generally, the web 110 and its plurality of assembly sheets 112 (FIG. 1) advance through the process step monitoring system 300 which measures and/or tests one or more coupon features of an assembly sheet (e.g., the coupon features 216 shown in FIGS. 2B and 2C).

The detection camera 310 captures images of a first portion of one of the plurality of assembly sheets 112 moving in the direction of arrow A that is within the field of view of the detection camera 310. As shown in FIG. 3B, the detection camera 310 is positioned above the web 110 such that the detection camera 310 can capture images of the plurality of coupon features 116 on each of the plurality of assembly sheets 112 as the web 110 moves through the process step monitoring system 300 in the direction of arrow A. More specifically, the detection camera 310 is configured to capture image(s) of a locating feature (e.g., locating feature 216A shown in FIG. 2B) of one or more of the plurality of assembly sheets 112. As shown in FIG. 3A, the detection camera 310 is communicatively coupled (e.g., using a wired or wireless connection) to the controller 380 such that the detection camera 310 can transmit one or more sets of image data that is reproducible as one or more images of at least a portion of an assembly sheet to the controller 380. The controller 380 analyzes the image data to identify a locating feature within the one or more sets of image data and also determines a position of the locating feature relative to the detection camera 310.

The first light source 320 provides illumination to aid operation of the detection camera 310. The intensity and/or the color of the illumination of the first light source 320 can be adjusted to aid the detection camera 310 in capturing images of the assembly sheet 112 that will be analyzed by the controller 380 (e.g., images including the locating feature of the assembly sheet). As shown in FIG. 3B, the first light source 320 is positioned between the detection camera 310 and the web 110. Alternatively, the detection camera 310 and the first light source 320 can be positioned facing opposing sides of the web 110 (e.g., such that the first light source 320 provides backlighting for the detection camera 310), or the detection camera 310 can be positioned between the first light source 320 and the web 110 (e.g., such that the first light source 320 is positioned above both the detection camera 310 and the web 110). As shown in FIG. 3A, the first light source 320 is communicatively coupled (e.g., using a wired or wireless connection) to the controller 380 such that the controller 380 can control the operation of the first light source 320. For example, the controller 380 can turn the first light source 320 on and off, the controller 380 can select and/or adjust the intensity (e.g., wavelength) and/or color of the illumination from the first light source 320 (e.g., the color can be selected based on the material), etc.

As described above, in some implementations, the one or more process coupons 216 of the assembly sheet 200 includes a feature 240 (e.g., a calibration pad). Based on the reflectivity of the calibration pad, the feature 240 can be used to determine an optimal light intensity of the second light source 340 and/or adjust the light intensity of the second light source 340. For example, if the controller 380 determines that the measured reflectivity is lower than a set parameter (e.g., because other ambient lighting conditions have changed), the controller 380 can increase the intensity of the second light source 340 to compensate.

The measurement camera 330 captures images of a second portion of an assembly sheet (e.g., a portion of the assembly sheet that is different than the portion of the assembly sheet captured by the detection camera). As shown in FIG. 3B, the measurement camera 330 is positioned downstream of the detection camera 310 (relative to arrow A) and above the web 110 such that the measurement camera can capture images of the plurality of coupon features 116 on each of the plurality of assembly sheets 112 as the web 110 moves through the process step monitoring system 300 in the direction of arrow A. As shown in FIG. 3A, the measurement camera 330 is communicatively coupled (e.g., using a wired or wireless connection) to the controller 380 such that the measurement camera 330 can transmit a set of image data that is reproducible as an image of a portion of an assembly sheet to the controller 380. As described in further detail below, the controller 380 analyzes the image data from the measurement camera 330 to identify one or more coupon features within the image data and measure one or more dimensions of the one or more identified coupon features (e.g., coupon features 224-244 shown in FIG. 2C).

In some implementations, the measurement camera 330 is positioned relative to the web 110 such that the plurality of assembly sheets 112 of the web 110 are not directly within the field of view of the measurement camera 330 (e.g., the field of view of the measurement camera 330 is generally parallel to the direction of travel of the web 110, rather than generally perpendicular to the direction of travel of the web 110). For example, the measurement camera 330 may be positioned in this manner due to space constraints within the system 300. In such implementations, the process step monitoring system 300 can further include one or more mirrors which can be positioned and/or angled such that the one or more mirrors are within the field of view of the measurement camera 330. These one or more mirrors permit the measurement camera 330 to indirectly capture images of the plurality of assembly sheets 112 of the web 110 despite the assembly sheets 112 not being directly within the field of view of the measurement camera 330. In some implementations, the mirrors include one or more motors that are configured to move the mirrors to aid in focusing the field of view of the measurement camera 330 onto the one or more coupon features of the plurality of assembly sheets 112. In addition, as described herein, the x-y axis positioning stage 332 can move the measurement camera 330 in conjunction with the one or more motors of the mirrors to further aid in focusing the field of view of the measurement camera 330 onto the one or more coupon features of the plurality of assembly sheets 112.

In some implementations, the measurement camera 330 and the second light source 340 are coupled to an x-y axis positioning stage 332 (FIG. 3A). The x-y axis positioning stage 332 can include one or more motors and is configured to move the measurement camera 330 and the second light source 340 for positioning relative to the plurality of assembly sheets 112 of the web 110 to aid in capturing images of one or more coupon features of the assembly sheets 112.

The detection camera 310 and the measurement camera 330 can comprise the same or different types of digital cameras, such as, for example, digital cameras that only record gray-scale images, digital cameras that only record color images, digital cameras that record gray-scale and color images, digital cameras that only record still images, digital cameras that only record video images, digital cameras that record still images and video images, high resolution or definition cameras, low resolution cameras, cameras with or without zooming ability (optical and/or digital zoom), or any combination thereof. Further, the detection camera 310 and/or the measurement camera 330 can be selected such that the captured images have a desired resolution and/or file size (e.g., 0.01 Mb, 0.1 Mb, 1 Mb, 10 Mb, etc.)

In some implementations, the measurement camera 330 has a resolution that is greater than a resolution of the detection camera 310 (e.g., the resolution of the detection camera 310 is sufficient to quickly detect a locating feature on the assembly sheet and the resolution of the measurement camera 330 is greater to accurately measure/test coupon features on the assembly sheet). As described above, generally, the locating feature (e.g., locating feature 216A shown in FIG. 2B) is larger than the one or more coupon features (e.g., coupon features 224-244 shown in FIG. 2C, which in some examples have a dimension of about 5 microns). Thus, the measurement camera 330 may require a higher resolution than the resolution required for the detection camera 310 to capture images of the locating feature. For example, the measurement camera 330 can have a resolution that is between about 110% and about 5,000% of the resolution of the detection camera 310, between about 150% and about 1,000% of the resolution of the detection camera 310, between about 300% and about 500% of the resolution of the detection camera 310, etc.

The second light source 340 is similar to the first light source 320 described above and provides illumination to aid operation of the measurement camera 330. The intensity and/or the color of the illumination of the second light source 340 can be adjusted to aid the measurement camera 330 in capturing images of the assembly sheet 112 that will be analyzed by the controller 380. As shown in FIG. 3B, the second light source 340 is positioned between the measurement camera 330 and the web 110. Alternatively, the measurement camera 330 and the second light source 340 can be positioned facing opposing sides of the web 110 (e.g., such that the second light source 340 provides backlighting for the measurement camera 330), or the measurement camera 330 can be positioned between the second light source 340 and the web 110 (e.g., such that the second light source 340 is positioned above both the measurement camera 330 and the web 110). As shown in FIG. 3A, the second light source 340 is communicatively coupled (e.g., using a wired or wireless connection) to the controller 380 such that the controller 380 can control the operation of the second light source 340. For example, the controller 380 can turn the second light source 340 on and off, the controller 380 can select and/or adjust the intensity and/or color of the illumination from the second light source 340, etc.

As shown in FIG. 3B, the optional testing device 350 is positioned downstream (relative to arrow A) of the detection camera 310. As shown in FIG. 3A, the optional testing device 350 is communicatively coupled (e.g., using a wired or wireless connection) to the controller 380. The optional testing device 350 can perform a variety of tests on one or more coupon features of an assembly sheet, such as, for example, a vision test, an electrical test, a spectroscopy test, a white light interferometer test, a destructive test, or any combination thereof.

In some implementations, the optional testing device 350 is configured to perform one or more tests that are associated with a process step performed by the manufacturing system 120 (FIG. 1). For example, if the manufacturing system 120 performs a conductor develop process step, the optional testing device 350 performs an electrical test and/or a spectroscopy test. As another example, if the manufacturing system 120 performs an electro-less plating process step, the optional testing device 350 performs an electrical test.

Referring to FIG. 3B, the vacuum hold-down device 360 is positioned between the detection camera 310 and the measurement camera 330. The vacuum hold-down device 360 is generally used to inhibit movement of a portion of the web 110. To stop a portion of the web 110, a vacuum plate of the vacuum hold-down device 360 is moved downward (in the opposite direction of arrow B in FIG. 3B) towards the web 110 such that the vacuum plate contacts a surface of the web 110. The vacuum hold-down device 360 includes a vacuum that provides a suction force through a plurality of apertures in the vacuum plate, which causes the vacuum hold-down device 360 to hold a portion of the web 110 in place without damaging or destroy the web 110 and without stopping movement of the entire web 110. To quickly release the web 110, air can be forced into the vacuum plate of the vacuum hold-down device 360 and through the plurality of apertures to force the web 110 away from the vacuum plate and back into place. As shown in FIG. 3A, the vacuum hold-down device 360 is communicatively coupled to the controller 380 such that the controller 380 can control the operation of the vacuum hold-down device 360.

In some implementations, the process step monitoring system 300 includes a z-axis positioning stage 362 (FIG. 3A). The z-axis positioning stage 362 can include one or more motors and is configured to move the vacuum hold-down device 360 towards the plurality of assembly sheets 112 (FIG. 3B) in the direction of arrow B when the vacuum hold-down device 360 is holding one of the plurality of assembly sheets 112 or a portion of the web 110 in place. By moving the held assembly sheet 112 towards the measurement camera 330, the z-axis positioning stage 360 aids the measurement camera 330 in focusing to capture images of the one or more coupon features of the assembly sheet, for example by moving at least a portion of the web into a field of focus of the measurement camera 330. After the measurement camera 330 has completed capturing images, the z-axis positioning stage 360 is configured to move the assembly sheet held by vacuum hold-down device 360 back in the opposite direction of arrow B (FIG. 3B) and away from the web 110 before the vacuum hold-down device 360 releases the held assembly sheet or portion of the web 110.

Referring to FIG. 3B, the accumulator 370 includes a plurality of transport mechanisms that are configured to assist in transporting the web 110 through the accumulator 370, including a first transport mechanism 372A, a second transport mechanism 372B, and a third transport mechanism 372C. Each of the transport mechanisms 372A-372C includes a roller with a generally circular cross-section (e.g., an active/motorized roller, a static/guide roller, etc.) or a pair of opposing rollers that contact the web 110. While the accumulator 370 is shown as having three transport mechanisms 372A-372C, more generally, any suitable number of transport mechanisms can be used (e.g., two, six, nine, fifteen, etc.) As shown in FIG. 3A, the accumulator 370 is communicatively coupled (e.g., using a wired or wireless connection) to the controller 380.

As described above, the vacuum hold-down device 360 is used to selectively inhibit movement of the web 110 in the direction of arrow A for a predetermined time to allow the measurement camera 330 capture an image(s) of coupon features of an assembly sheet and/or to allow the optional testing device 350 to perform tests on the coupon features. However, as also described above, the web 110 is continuously advanced between the first roll 140A and the accumulator 370 in the direction of arrow B. It is undesirable to stop movement of the entire web 110 for the measurement camera 330 and/or the optional testing device 350 to measure/test coupon features because the web 110 must continue to move through the manufacturing system 120 (FIG. 1). Also, stopping movement of the entire web 110 each time the measurement camera 330 captures an image of an assembly sheet 112 would slow down the manufacturing process and lead to inefficiencies.

To permit a portion of the web 110 (e.g., one or more assembly sheets, five or more assembly sheets, ten or more assembly sheets, etc.) to be stopped for a predetermined time period for the measurement camera 330 and/or testing device 350, the accumulator 370 takes up the feed of the web 110 in direction of arrow A. The accumulator 370 takes up the feed by moving, for example, the second transport mechanism 372B vertically in the direction of arrow B along a vertical track. This vertical movement increases the distance that the web 110 travels within the accumulator 370 before exiting, thus permitting the vacuum hold-down device 360 to temporarily inhibit movement of a portion of the web 110 without stopping movement of the entire web 110. The accumulator 370 can permit a portion of the web 110 to be stopped for a variety of time periods, such as, for example, between about 0.1 seconds and about 15 seconds, between about 0.5 seconds and about 8 seconds, between about 2 seconds and about 4 seconds, etc.

The controller 380 includes one or more processors 382 and one or more memory devices 384. The one or more processors 382 can include, but are not limited to, central processing units, application specific integrated circuits (ASIC), graphics processing units, digital signal processors (DSP), field-programmable gate arrays, and other processing units. The one or more memory devices 384 can include, but are not limited to, solid-state memory, magnetic storage, optical storage, and other memory devices. As described above and shown in FIG. 3A, the controller 380 is communicatively coupled to the detection camera 310, the first light source 320, the measurement camera 330, the second light source 340, the optional testing device 350, the vacuum hold-down device 360, the accumulator 370, or any combination thereof. The one or more processors 382 execute instructions stored in the one or more memory devices 384 and control the operation of the other components to which the controller 380 is communicatively coupled. Further, as described in more detail below, the controller 380 can also be communicatively coupled (e.g., using a wired connection or a wireless connection) to the manufacturing device 120 (FIG. 1). The controller 380 can also be communicatively coupled to a network database such that the controller 380 can transmit recorded data (e.g., from the measurement camera) to the network database for storage and/or further analysis.

Figure 4:
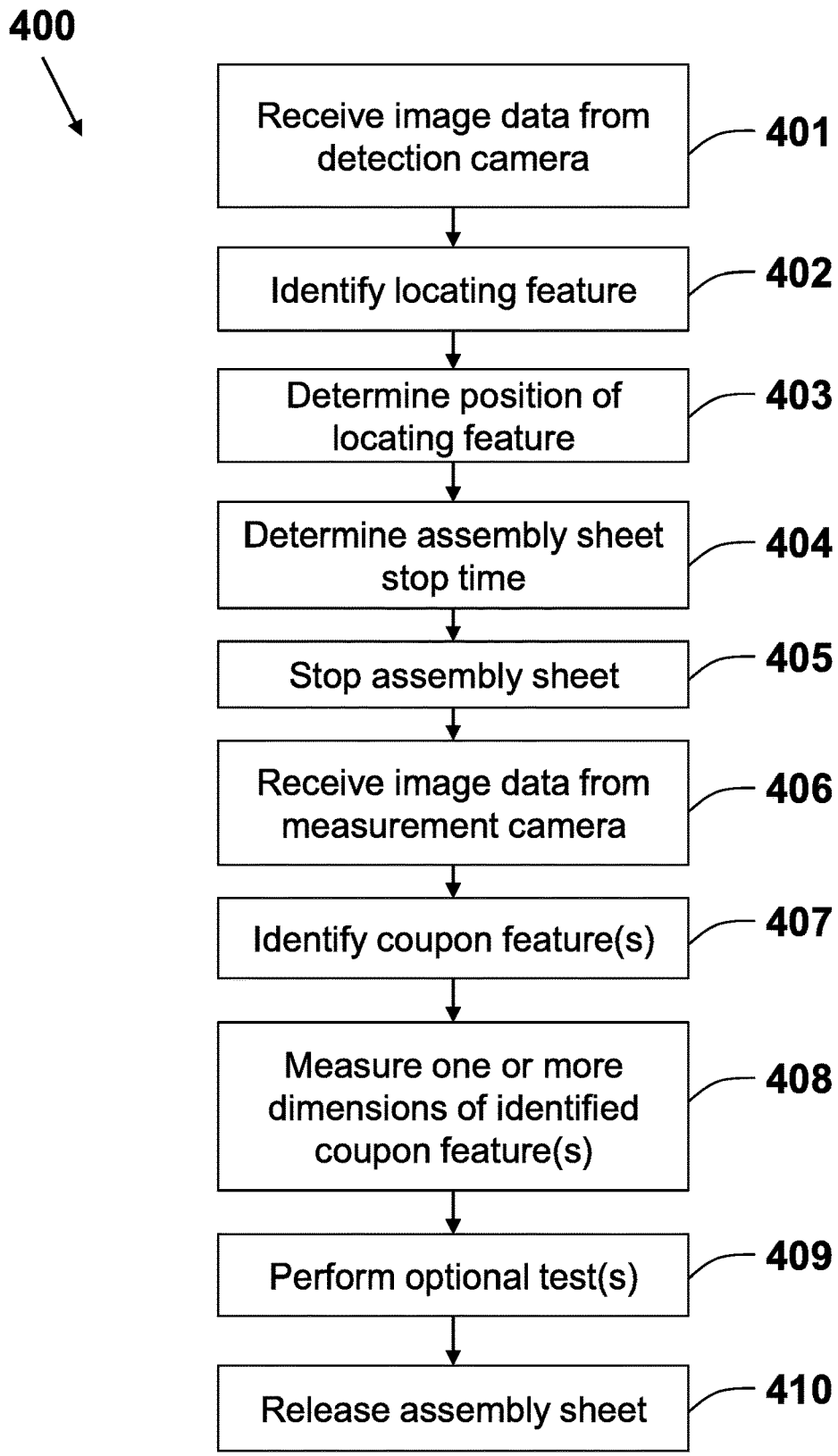
FIG. 4 illustrates a process flow diagram for a method of operating the process step monitoring system of FIGS. 3A and 3B according to some implementations of the present disclosure.

Referring to FIG. 4, a method 400 can be used to monitor a process step during manufacturing of a plurality of assembly sheets. For example, the method 400 can be used to monitor the process step performed by the manufacturing system 120 (FIG. 1) using the process step monitoring system 300 (FIGS. 3A and 3B).

Step 401 includes receiving image data, from one or more detection cameras, such as those described herein, reproducible as an image of a portion of an assembly sheet of a web. The one or more detection cameras are configured to transmit the image data to one or more controllers, such as those described herein. At step 402, the system analyzes the image data received to identify a locating feature (e.g., a locating feature that is the same as, or similar to, the locating feature 216A shown in FIG. 2B of the assembly sheet). The one or more processors of the controller can be used to identify the locating feature within the received image data. For example, the one or more processors can identify the locating features within the image data using one or more filters (e.g., a shape filter). Advantageously, as described above, given the size and shape of the locating feature (e.g., locating feature 216A shown in FIG. 2B), the image captured by the one or more detection cameras can have a relatively low resolution (e.g., lower than a measurement camera, such as those described herein) and, according to some implementations, an assembly sheet does not need to be stopped in order to capture an image in which the locating feature can be identified.

If no locating feature is identified within the image data during an identifying of step 402, the method 400, for some implementations, is configured to repeat step 401, capturing a second image of a portion of an assembly sheet. Step 402 is repeated to identify a locating feature within the second image of the portion of the assembly sheet. In this manner, step 401 and step 402 can be repeated one or more times until a locating feature of an assembly sheet is identified.

The method 400 at step 403 includes determining, based on the received image data, a position/location of the locating feature identified during step 402 relative to one or more detection cameras at a time $t_0$. The one or more processors of the controller can be used to determine this position of the locating feature.

The method 400 at step 404 includes determining, based on the determined position of the locating feature at step 403 at a time $t_0$, an assembly sheet stop time $t_{stop}$. The assembly sheet stop time $t_{stop}$ is calculated such that when a hold-down device, such as those described herein, is activated at the assembly sheet stop time $t_{stop}$, movement of the web and thus the assembly sheet will be stopped such that one or more coupon features of the assembly sheet are positioned within the field of view of one or more measurement cameras. To calculate the assembly sheet stop time $t_{stop}$, a known distance between a detection camera and a measurement camera and a known advancement speed of the web is stored in a memory device of the controller. Using these variables, the one or more processors can be used to calculate the assembly sheet stop time $t_{stop}$. For example, the assembly sheet stop time $t_{stop}$ may be 0.1 seconds after the time $t_0$.

The method 400 at step 405 includes stopping the movement of a portion of the web at the assembly sheet stop time $t_{stop}$, and thus the assembly sheet with the identified locating feature, by lowering a vacuum hold-down device, such as those described herein, in the manner described above. Movement of the portion of the web is inhibited by the vacuum hold-down device for a predetermined measurement time period. The predetermined measurement time period is generally the time period required for a measurement camera to capture images of one or more coupon features and/or for those coupon features to be detected and measured. In some implementations, the predetermined measurement time can be between about 0.1 seconds and about 10 seconds, between about 1 second and about 5 seconds, and more preferably, between about 2 seconds and about 4 seconds.

In some implementations, rather than calculating an assembly sheet stop time $t_{stop}$ at step 404, the second transport mechanism 372B of the accumulator 370 (FIG. 3B) can be used to control the assembly sheet stop time $t_{stop}$. As described herein, the second transport mechanism 372B moves vertically in the direction of arrow B to take up the feed of the web 110 while the vacuum hold-down device 360 holds at least a portion of the web 110. Thus, the vertical distance that the second transport mechanism 372B moves can be adjusted to accommodate the required measurement times for the measurement camera 330, rather than calculating an assembly sheet stop time $t_{stop}$ based on a distance between the detection camera 310 and the measurement camera 330.

With movement of a portion of the web stopped and one or more coupon features of the assembly sheet positioned within the field of view of a measurement camera, the method 400 at step 406 includes receiving image data, from one or more measurement cameras. As described herein, for some implementations this includes data reproducible as one or more images of at least a portion of an assembly sheet of the web. One or more measurement cameras are configured to transmit the image data to the memory device of a controller for processing/analysis. As described herein, because the coupon features may have small dimensions (e.g., less than about 20 microns), for some implementations, movement of the assembly sheet is stopped to permit the one or more measurement cameras to capture sufficiently high resolution images for analysis. In some implementations, a first measurement camera obtains image data of a first portion of a coupon feature and at least one other measurement camera, such as a second measurement camera, obtains image data of another portion of the coupon feature. The image data from the first camera and the at least one other measurement camera is combined for analyzing as described herein.

The method 400 at step 407 includes analyzing (e.g., using one or more processors such as the one or more processors 382 shown in FIG. 3A) the set of image data received from at least one measurement camera to identify one or more coupon features of the assembly sheet (e.g., one or more of the coupon features 216B-216F shown in FIG. 2B and/or the features 224-244 of the exemplary coupon 220 shown in FIG. 2C). For example, the method at step 407 can include identifying the presence of one or more coupon features on the assembly sheet having a dimension that is between about 1 micron and about 100 microns, 5 microns and about 75 microns, or more preferably between about 7 microns and about 50 microns.

The method 400 at step 408 includes measuring (e.g., using one or more processors such as the one or more processors 382 shown in FIG. 3A) one or more dimensions of the one or more identified coupon features of the assembly sheet. For example, the method at step 408 can include measuring one or more coupon features having a dimension that is less than about 100 microns, less than about 50 microns, or more preferably, less than about 20 microns. The measuring of a plurality of identified coupon features can occur simultaneously or sequentially. Further, the measuring of the identified one or more coupon features can occur, in whole or in part, before or after the releasing of the assembly sheet described below (e.g., the identified coupon features in the captured image data from the measurement camera can be measured in real-time before advancing the assembly sheet (step 410), or the identified coupon features in the captured image data from the measurement camera can be measured at a later time after advancing the assembly sheet (step 410)).

The measurements of step 408 can be stored in a database (e.g., in the memory device 384 of the controller 380). Further, as described above, each of the plurality of assembly sheets can include a barcode associated with a unique identifier for each assembly sheet. Thus, the measurements of step 408 can be stored in a database and associated with the unique identifier of the assembly sheet from which the measurements were taken.

Based on the one or more measured dimensions of the one or more coupon features, the method at step 408 can further include determining whether the assembly sheet includes an abnormal portion. As described herein, variations in the coupon features (e.g., coupon features 224-244 shown in FIG. 2C) can indicate whether a portion of the plurality of components 114 includes an abnormality (e.g., defect), and/or whether parameters, characteristics and/or other aspects of the manufacturing process need to be altered before abnormal (e.g., defective) components are produced. If it is determined that the assembly sheet includes an abnormal portion, the method at step 408 further includes adjusting the associated process step (e.g., of the manufacturing system 120 shown in FIG. 1) to aid in preventing the abnormal portion on a future assembly sheet of the web (or a different web).

To adjust the associated process step, one or more controllers (e.g., the controller 380 of FIG. 3A) can be communicatively coupled to at least one manufacturing device (e.g., manufacturing device 120 of FIG. 1), another device (e.g., a display) or database. Based on the measurements of the coupon features during the method at step 408, it can be determined which of a plurality of process steps needs adjustment, such as, for example, applying a dielectric layer, applying a conductive layer, applying a backing layer, etching a base layer, etching a dielectric layer, etching a conductive layer, etching a backing layer, or any combination thereof. The adjusting of the process step can include, for example, adjusting a conveyer speed, adjusting a manifold pressure, adjusting a chemical concentration, adjusting a chemistry temperature, adjusting a baking temperature, adjusting a curing temperature, or any combination thereof. In this manner, a variety of process steps used to manufacture a plurality of components of each assembly sheet can be both (i) monitored to identify abnormal or defective components (ii) adjusted based on feedback from the process step monitoring system to aid in preventing future abnormal or defective components.

In some implementations, the method 400 includes optional step 409, which includes performing one or more tests on one or more coupon features (e.g., using the optional testing device 350 shown in FIGS. 3A and 3B). As described herein, the test can be, for example, a vision test, an electrical test, a spectroscopy test, a white light interferometer test, or any combination thereof. The testing during the optional step 409 occurs for a predetermined test time, which can be, for example, between about 0.1 seconds and about 10 seconds, between about 1 second and about 5 seconds, or more preferably between about 0.5 seconds and about 4 seconds.

The method at step 410 includes releasing the portion of the web that was stopped by the vacuum hold-down device (e.g., vacuum hold-down device 360 of FIGS. 3A and 3B) during the method at step 405 such that the web can continue to advance (e.g., in the direction of arrow A of FIGS. 1 and 3B). The method releases the assembly sheet or portion of the web at step 410 once the predetermined measurement period elapsed. For some implementations, the assembly sheet or portion of the web is released based on the measurement being acquired or determined. In other words, there is no predetermined measurement period, but the measurement continues until a controller determines the measurement has been acquired by the system or cannot be acquired. Thus, the measurement period is dynamic. The controller is configured to disable the vacuum hold-down device to release the assembly sheet or portion of the web. In implementations where the method 400 includes the optional step 409, the assembly sheet or portion of the web is released during the step 410.

The method 400 can be repeated one or more times to identify, measure, and/or test one or more coupon features of all or some of the plurality of assembly sheets of the web.

As described herein, for some implementations, the web can travel at speeds between about 0.1 meters per minute and about 10 meters per minute, between about 1 meter per minute and about 8 meters per minute, between about 1 meter per minute and about 4 meters per minute, etc. For example, the process step monitoring system 300 is configured to detect/identify one or more coupon features of about 75% of the plurality of assembly sheets 112 comprising the web 110 while the web 110 is traveling at about 4 meters per minute. As another example, the process step monitoring system 300 is configured to detect/identify and measure one or more coupon features of about 50% of the plurality of assembly sheets 112 comprising the web 110 while the web 110 is traveling at about 2 meters per minute.

It is to be understood that many modifications and variations may be devised given the above description of the general principles of the present disclosure. It is intended that all such modifications and variations be considered as within the spirit and scope of the present disclosure, as defined in the following claims.

What is claimed is:

1. A method for monitoring a process step during manufacturing of a plurality of assembly sheets, the method comprising:
   with the plurality of assembly sheets advancing between a first roll and a second roll, receiving, from a first camera, a first set of image data reproducible as a first image of a first portion of a first assembly sheet of the plurality of assembly sheets;
   analyzing, using one or more processors, the first set of image data to identify a locating feature of the first assembly sheet;
   determining, using at least one of the one or more processors and the first set of image data, a position of the locating feature relative to the first camera;
   based on the determined position of the locating feature and a predefined distance between the first camera and the second camera, determining a first assembly sheet stop time;
   inhibiting further advancement of the first assembly sheet;
   receiving, from the second camera, a second set of image data reproducible as a second image of a second portion of the first assembly sheet;
   analyzing, using at least one of the one or more processors, the second set of image data to identify a coupon of the first assembly sheet;
   detecting, using at least one of the one or more processors, one or more features of the identified coupon;
   measuring, using at least one of the one or more processors, one or more dimensions of the one or more detected features of the identified coupon; and
   permitting advancement of the first assembly sheet.

2. The method of claim 1, further comprising storing (i) the one more detected features of the coupon, (ii) the one or more measured dimensions of the detected features of the coupon, or (iii) both in a database.

3. The method of claim 1, wherein the one or more features of the coupon include a size, a height, a thickness, a width, a diameter, a conductivity, a resistance, a reflectivity, an adhesion, a side slope, a color, or any combination thereof.

4. The method of claim 1, wherein the one or more features of the coupon include a plurality of circular dots of varying size, a plurality of circular holes, a plurality of horizontal rectangles, a plurality of horizontal rectangular troughs, a plurality of vertical rectangles, a plurality of vertical rectangular troughs, registration layers, a star pattern, a plurality of ground features, a spiraled conductor, or any combination thereof.

5. The method of claim 1, wherein the locating feature of the first assembly sheet is positioned adjacent to a leading edge of the first assembly sheet, positioned between a plurality of components of the first assembly sheet, positioned on a carrier strip of the first assembly sheet, or any combination thereof.

6. The method of claim 1, wherein the permitting advancement of the first assembly sheet occurs after a predetermined measurement time that is between 2 seconds and 4 seconds.

7. The method of claim 1, wherein the first image of the first portion of the first assembly sheet has a first resolution and the second image of the second portion of the first assembly sheet has a second resolution, wherein the second resolution is higher than the first resolution.

8. The method of claim 1, further comprising
determining, based on the measured one or more dimensions of the one or more features of the coupon, if the first assembly sheet includes an abnormal portion; and
responsive to determining that the first assembly sheet includes an abnormal portion, adjusting the process step to aid in preventing the abnormal portion in a second assembly sheet of the plurality of assembly sheets.

9. The method of claim 8, wherein the process step includes applying a dielectric layer, applying a conductive layer, applying a backing layer, etching a base layer, etching a dielectric layer, etching a conductive layer, etching a backing layer, or any combination thereof.

10. The method of claim 8, wherein adjusting the process step includes adjusting a conveyer speed, adjusting a manifold pressure, adjusting a chemical concentration, adjusting a chemistry temperature, adjusting a baking temperature, adjusting a curing temperature, or any combination thereof.

11. The method of claim 1, further comprising, adjusting an intensity of a light source positioned between the first camera and the first assembly sheet to aid in identifying the locating feature of the first assembly sheet.

12. The method of claim 11, further comprising, adjusting an intensity of a second light source positioned between the second camera and the first assembly sheet to aid in the detecting and the measuring of one or more features of the coupon.

13. The method of claim 12, wherein the intensity of the second light source is different than the intensity of the first light source.

14. The method of claim 1, further comprising, performing, using one or more testing devices, a test, wherein the first assembly sheet permitted to advance responsive to determining at least one of a predetermined measure period has elapsed, that a predetermined test time have elapsed, and a measurement has been acquired.

15. The method of claim 14, wherein the test is a vision test, an electrical test, a spectroscopy test, a white light interferometer test, or any combination thereof.

16. The method of claim 14, further comprising storing the performed test results in a database.

17. The method of claim 14, wherein the predetermined test time is between 0.5 seconds and 4 seconds.

18. The method of claim 14, further comprising:
determining, based on (i) the measured one or more dimensions of the one or more features of the coupon, (ii) the performed test, or (iii) both, the first assembly sheet includes an abnormal portion; and
adjusting the process step to aid in preventing the abnormal portion in a second assembly sheet of the plurality of assembly sheets.

19. The method of claim 18, wherein the process step includes applying a dielectric layer, applying a conductive layer, applying a backing layer, etching a base layer, etching a dielectric layer, etching a conductive layer, etching a backing layer, or any combination thereof.

20. The method of claim 18, wherein adjusting the process step includes adjusting a conveyer speed, adjusting a manifold pressure, adjusting a chemical concentration, adjusting a chemistry temperature, adjusting a baking temperature, adjusting a curing temperature, or any combination thereof.

21. The method of claim 1, wherein inhibiting further advancement of the first assembly sheet includes:
extending a vacuum plate of a vacuum hold-down device such that the vacuum plate contacts a surface of the first assembly sheet, and
activating a vacuum of the vacuum hold-down device to apply a suction force to the first assembly sheet, thereby aiding in inhibiting advancement of the first assembly sheet.

22. The method of claim 1, wherein the detected one or more features of the coupon of the first assembly sheet have a first dimension that is between 7 microns and 50 microns.

23. The method of claim 1, wherein the measured one or more dimensions of the one or more detected features of the coupon is less than 20 microns.

24. The method of claim 2, further comprising:
detecting, using the first camera, an identifier of the first assembly sheet; and
associating the one or more stored, detected features of the coupon, the one or more stored, measured dimensions of the features of the coupon, or both, with the identifier of the first assembly sheet.

25. A system for monitoring a process step during manufacturing of an assembly sheet, the system comprising:
a detection camera configured to capture a first image of the assembly sheet, the first image including a locating feature of the assembly sheet;
a vacuum hold-down device for selectively inhibiting advancement of the assembly sheet along a process step line; and
a measurement camera configured to capture a second image of the assembly sheet responsive to the vacuum hold-down device inhibiting advancement of the assembly sheet, the second image including one or more features of a coupon of the assembly sheet.

26. The system of claim 25, wherein the one or more features of the coupon include a size, a height, a thickness, a width, a diameter, a conductivity, a resistance, a reflectivity, an adhesion, a side slope, a color, or any combination thereof.

27. The system of claim 25, wherein the one or more features of the coupon include a plurality of circular dots of varying size, a plurality of circular holes, a plurality of horizontal rectangles, a plurality of horizontal rectangular troughs, a plurality of vertical rectangles, a plurality of vertical rectangular troughs, registration layers, a star pattern, a plurality of ground features, a spiraled conductor, or any combination thereof.

28. The system of claim 25, wherein the locating feature of the first assembly sheet is positioned adjacent to a leading edge of the assembly sheet, positioned between a plurality of components of the first assembly sheet, positioned on a carrier strip of the first assembly sheet, or any combination thereof.

29. The system of claim 25, wherein the vacuum hold-down device for selectively inhibiting advancement of the assembly sheet along a process step line is configured to inhibit the advancement for a predetermined measurement time is between 2 seconds and 4 seconds.

30. The system of claim 25, wherein the first image of the first assembly sheet has a first resolution and the second image of the first assembly sheet has a second resolution, wherein the second resolution is higher than the first resolution.

31. The system of claim 25, wherein the process step includes applying a dielectric layer, applying a conductive layer, applying a backing layer, etching a base layer, etching a dielectric layer, etching a conductive layer, etching a backing layer, or any combination thereof.

32. The system of claim 25, further comprising one or more testing devices for performing one or more tests on the coupon of the assembly sheet for a predetermined test time.

33. The method of claim 32, wherein the one or more tests includes a vision test, an electrical test, a spectroscopy test, a white light interferometer test, or any combination thereof.

34. The method of claim 32, wherein the predetermined test time is between 0.5 seconds and 4 seconds.

35. The system of claim 25, wherein the vacuum hold-down device includes a vacuum plate and a vacuum configured to apply a suction force to the first assembly sheet responsive to moving the vacuum plate such that the vacuum plate contacts a first surface of the assembly sheet.

36. The system of claim 25, wherein the detection camera and the measurement camera are positioned adjacent to a first side of the assembly sheet.

37. A system for monitoring a process step during manufacturing of a plurality of assembly sheets, the system comprising:
at least one detection camera;
at least one measurement camera positioned downstream relative to the detection camera in the process line;
a vacuum hold-down device;
one or more processors; and
a memory device storing instructions that, when executed by at least one of the one or more processors cause the system to,
receive, from the at least one detection camera, a first set of image data reproducible as a first image of a first portion of a first assembly sheet of the plurality of assembly sheets;
analyze, the first set of image data to identify a locating feature of the first assembly sheet;
determine, a position of the locating feature relative to the at least one detection camera;
based on the determined position of the locating feature and a predetermined distance between the locating feature and a coupon of the first assembly sheet, determine a first assembly sheet stop time;
activate the vacuum hold-down device to inhibit further advancement of the first assembly sheet;
receive, from the measurement camera, a second set of image data reproducible as a second image of a second portion of the first assembly sheet;
analyze the second set of image data to identify one or more features of the coupon of the first assembly sheet;
measure one or more dimensions of the one or more identified features of the coupon; and
deactivate the vacuum hold-down device to release the first assembly sheet and permit advancement of the first assembly sheet.

38. The system of claim 37, wherein the one or more features of the coupon include a size, a height, a thickness, a width, a diameter, a conductivity, a resistance, a reflectivity, an adhesion, a side slope, a color, or any combination thereof.

39. The system of claim 37, wherein the one or more features of the coupon include a plurality of circular dots of varying size, a plurality of circular holes, a plurality of horizontal rectangles, a plurality of horizontal rectangular troughs, a plurality of vertical rectangles, a plurality of vertical rectangular troughs, registration layers, a star pattern, a plurality of ground features, a spiraled conductor, or any combination thereof.

40. The system of claim 37, wherein the system is configured to activate the vacuum hold-down device for a predetermined measurement time that is between 2 seconds and 4 seconds.

41. The system of claim 37, wherein the first image of the first portion of the first assembly sheet has a first resolution and the second image of the second portion of the first assembly sheet has a second resolution, wherein the second resolution is higher than the first resolution.

42. The system of claim 37, further comprising, one or more testing devices, and wherein the instructions stored on the memory device, when executed by at least one of the one or more processors cause the system to, perform, using the one or more testing devices, a test for a predetermined test time, and wherein the first assembly sheet permitted to advance responsive to determining that both a predetermined measure period and a predetermined test time have elapsed.

43. The system of claim 42, wherein the test is a vision test, an electrical test, a spectroscopy test, a white light interferometer test, or any combination thereof.

44. The system of claim 37, wherein the vacuum hold-down device includes a vacuum plate configured to contact a surface of the first assembly sheet and a vacuum configured to apply a suction force to the first assembly sheet through the vacuum plate.

45. The system of claim of claim 44, wherein the vacuum hold-down device is configured to move in at least one direction toward the at least one measurement camera to bring at least the first portion of the first assembly sheet into a field of focus of the at least one measurement camera.

46. A method for monitoring a process step during manufacturing of a plurality of assembly sheets, the method comprising:
receiving, from a first camera, a first set of image data reproducible as a first image of a first portion of a first assembly sheet of the plurality of assembly sheets;
determining, using the first set of image data, a position of a locating feature of the first assembly relative to the first camera;
inhibiting further advancement of the first assembly sheet such that one or more coupon features of the first assembly sheet are positioned with a field of view of a second camera for a predetermined measurement period;
receiving, from the second camera, a second set of image data reproducible as a second image of a second portion of the first assembly sheet;
analyzing the second set of image data to identify the one or more coupon features of the first assembly sheet;
measuring one or more dimensions of the one or more coupon features of the first assembly sheet; and responsive to determining that the predetermined measurement period has elapsed, permitting advancement of the first assembly sheet.

\* \* \* \* \*